United States Patent
Kim

(10) Patent No.: US 7,120,436 B2
(45) Date of Patent: Oct. 10, 2006

(54) METHOD AND SYSTEM FOR UPDATING OF HOME-ZONE LIST AUTOMATICALLY IN MOBILE TELECOMMUNICATION SYSTEM

(75) Inventor: Young-Hae Kim, Songnam-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 417 days.

(21) Appl. No.: 10/155,166

(22) Filed: May 28, 2002

(65) Prior Publication Data
US 2003/0119501 A1    Jun. 26, 2003

(30) Foreign Application Priority Data
Dec. 4, 2001    (KR) ............... 2001-76286

(51) Int. Cl.
*H04Q 7/20*    (2006.01)
(52) U.S. Cl. ............... 455/433; 455/422.1; 455/429; 455/435.3; 455/406; 455/404.2; 455/443; 455/450; 455/453; 455/512; 455/525; 455/456.1
(58) Field of Classification Search ............... 455/433, 455/422.1, 429, 435.3, 406, 404.2, 443, 450, 455/453, 512, 525, 456.1
See application file for complete search history.

(56) References Cited

U.S. PATENT DOCUMENTS

| | | | |
|---|---|---|---|
| 5,479,481 A * | 12/1995 | Koivunen ............... | 455/433 |
| 5,564,071 A * | 10/1996 | Liou et al. ............... | 455/520 |
| 5,907,807 A * | 5/1999 | Chavez et al. ............... | 455/436 |
| 5,956,647 A * | 9/1999 | McDonald et al. ............... | 455/518 |
| 5,960,356 A * | 9/1999 | Alperovich et al. ............... | 455/458 |
| 6,044,261 A * | 3/2000 | Kazmi ............... | 455/408 |
| 6,424,840 B1 * | 7/2002 | Fitch et al. ............... | 455/456.1 |
| 6,571,096 B1 * | 5/2003 | Plunkett ............... | 455/436 |
| 6,631,262 B1 * | 10/2003 | Wee ............... | 455/433 |
| 6,836,653 B1 * | 12/2004 | Kang ............... | 455/408 |

(Continued)

FOREIGN PATENT DOCUMENTS

WO    WO 00/57577    9/2000

OTHER PUBLICATIONS

Korean Application No. 2000-59750 by Kim, filed in the Republic of Korea on Oct. 11, 2000.

(Continued)

*Primary Examiner*—Joseph Feild
*Assistant Examiner*—David Nguyen
(74) *Attorney, Agent, or Firm*—Robert E. Bushnell, Esq.

(57) ABSTRACT

A method and system is for automatically updating a home-zone list in a subscriber database as the configuration of a cell changes in a cellular mobile telecommunication system mounted with a home-zone service center. Specifically, the method includes the steps of deciding at least one base station having a base station system parameter according to a change in the cell configuration because of expansion, moving or dismantlement of a base station, selecting at least one subscriber who is under the influence of changes in the base station, generating a home-zone list including at least one home-zone base station that can provide a home-zone service to every selected subscriber, and updating a database of the subscriber based on the generated home-zone list. Therefore, the present invention enables to update the home-zone list that is necessary to provide the best quality home-zone services to the subscribers every time the configuration of the cell changes, thereby applying a subscriber home-zone list more accurately and fast.

18 Claims, 9 Drawing Sheets

U.S. PATENT DOCUMENTS

| | | | |
|---|---|---|---|
| 2001/0005676 A1* | 6/2001 | Masuda et al. | 455/433 |
| 2001/0049287 A1* | 12/2001 | Plunkett | 455/436 |
| 2002/0077142 A1* | 6/2002 | Sato et al. | 455/525 |
| 2003/0186695 A1* | 10/2003 | Bridges et al. | 455/432 |
| 2004/0224682 A1* | 11/2004 | Kang | 455/433 |

OTHER PUBLICATIONS

*Japanese Office Action* issued on the Jun. 28, 2005 by the Japan Patent Office for Applicant's corresponding co-pending Japanese Patent Application No. 2002-350787.

* cited by examiner

|  | COLUMN | TYPE | LENGTH | CONTENT |
|---|---|---|---|---|
| 1 | BTS_ID | CHAR | 16 | BASE STATION ID |
| 2 | LATI | CHAR | 10 | LATITUDE |
| 3 | LONG | CHAR | 11 | LONGITUDE |
| 4 | ANGLE1 | SMALLINT | 2 | ANGLE OF ALPHA SECTOR |
| 5 | ANGLE2 | SMALLINT | 2 | ANGLE OF BETA SECTOR |
| 6 | ANGLE3 | SMALLINT | 2 | ANGLE OF GAMMA SECTOR |
| 7 | S_DELAY1 | SMALLFLOAT | 4 | SYSTEM DELAY OF ALPHA SECTOR |
| 8 | S_DELAY2 | SMALLFLOAT | 4 | SYSTEM DELAY OF BETA SECTOR |
| 9 | S_DELAY3 | SMALLFLOAT | 4 | SYSTEM DELAY OF GAMMA SECTOR |
| 10 | SVC_RAN1 | SMALLFLOAT | 4 | SERVICE RANGE OF ALPHA SECTOR |
| 11 | SVC_RNA2 | SMALLFLOAT | 4 | SERVICE RANGE OF BETA SECTOR |
| 12 | SVC_RAN3 | SMALLFLOAT | 4 | SERVICE RANGE OF GAMMA SECTOR |
| 13 | EXP_RAN | SMALLFLOAT | 4 | EXCEPTION RANGE |
| 14 | CHANGE | SMALLINT | 2 | CHANGED BTS |

FIG. 5

| SUBSCRIBER DATA BASE | |
|---|---|
| NSN | MOBILE TELECOMMUNICATION SERVICE CARRIER CODE |
| NID | NETWORK ID |
| BTS 1 | (N=1) BASE STATION ID |
| SECTOR 1 | (N=1) SECTOR ID |
| RTD 1 | (N=1) MINIMUM RTD |
| OFFSET 1 | (N=1) MAXIMUM RTD |
| ⋮ | ⋮ |
| NID 16 | NETWORK ID |
| BTS 16 | (N=16) BASE STATION ID |
| SECTOR 16 | (N=16) SECTOR ID |
| RTD 16 | (N=16) MINIMUM RTD |
| OFFSET 16 | (N=16) MAXIMUM RTD |

FIG. 6

METHOD AND SYSTEM FOR UPDATING OF HOME-ZONE LIST AUTOMATICALLY IN MOBILE TELECOMMUNICATION SYSTEM

CLAIM OF PRIORITY

This application makes reference to, incorporates the same herein, and claims all benefits accruing under 35 U.S.C. §119 from an application for METHOD AND SYSTEM FOR UPDATING OF HOME-ZONE LIST AUTOMATICALLY IN MOBILE TELECOMMUNICATION SYSTEM earlier filed in the Korean Industrial Property Office on 4 Dec. 2001 and there duly assigned Serial No. 2001-76286.

BACKGROUND OF THE INVENTION

1. Field of the Invention

The present invention relates generally to a mobile telecommunication system, and more particularly, to a method and system for updating of a home-zone list in a database for home-zone service especially when a user wants to change a configuration of a cell.

2. Description of the Related Art

In general, a cellular mobile communication system means the system which includes a plurality of base transceiver subsystems (BTS), a plurality of base station controllers (BSC), and a mobile switching center (MSC), and through which a mobile subscriber can have communication with others using a portable wireless terminal while moving one place to another. Especially, the mobile telecommunication system providing a home-zone service establishes a particular region, a home-zone, and applies differential charges on calls in the home-zone region. Here, the home-zone region indicates a region whose charging rate is different from other regions.

This home-zone service is created to meet diverse needs of the subscribers by differentiating the charging system in the mobile telecommunication. Generally, the home-zone region is a circular service area with a designated radius, having the registered home address of a mobile subscriber as the center. In this manner, the mobile subscriber can make phone calls at very low wire telephone call charge within the home-zone region, and is charged of mobile phone charges outside of the home-zone region.

Once a mobile terminal subscriber subscribes to the home-zone service, a service carrier coordinates the corresponding subscriber's home address, and sets a roughly circular home-zone region having a designated radius (for example, 1 km (kilometer)) from the coordinates. Here, the home-zone region can cover one or a plurality of cell regions, depending on the home address of the subscriber. Information data for indicating the established home-zone region is recorded in a home location register (HLR), to which one or a plurality of mobile switching systems can be connected. Furthermore, in case there is a service request from the subscriber who had registered to the home-zone service, the information data is used to apply differential charges in accordance with the home-zone information. However, the configuration of a cell after initiating of an initial service keeps changing continuously. In other words, the configuration of a cell can be changed because a base station is sometimes expanded or moved or taken away to optimize radio environment. Therefore, if the expansion and moving of the base station brings a change to the base station where calls are usually received, the base station providing the home-zone service to the subscriber is also changed, and the home-zone information should be changed eventually.

When thusly changed cell configuration is not properly reflected on the home-zone list, the subscriber is not able to make calls normally within the home-zone region, or is charged of wrong phone fees. Not only for the subscriber, but also the service carrier might suffer a loss by accidentally applying the home-zone phone call charge to a non-home-zone region. That is to say, if only the first registered information to the home-zone region is used for the home-zone service, it is always possible to bring damage suffered by the loss on the service carrier or the service subscriber because of the change in the cell configuration or the wrongfully established home-zone region.

As an attempt to solve the problem described above, the present applicant filed a patent application with the Korean Intellectual Property Office on Oct. 11 of 2000, Korean Pat. No. 2000-59750, under the title, "System and method for real-time updating of home-zone database in mobile telecommunication system". Particularly, the patent application introduced a system and method for updating a home-zone region of a subscriber by receiving information about a home-zone confirmation call from a mobile switching system through the home-zone confirmation call connection requested form the subscriber, storing and utilizing the home-zone confirmation call information. Unfortunately however, in such case, since the subscriber has to connect home-zone confirmation call by himself, it was rather uncomfortable for many subscribers to do so every time, and any changes in the home-zone region caused by the change of the configuration of a cell before the subscriber connects the call was not reflected in a real-time mode.

SUMMARY OF THE INVENTION

It is, therefore, an object of the present invention to provide a method and system for updating home-zone information to provide home-zone services to mobile subscribers.

It is another object of the present invention to provide a method and system for updating a home-zone list of a home-zone subscriber in a real-time mode when the configuration of a cell changes.

To achieve the above and other objects, there is provided a method for updating a home-zone list in a subscriber database according to a change in a cell configuration in a cellular mobile telecommunication system mounted with a home-zone service center, the method including the steps of deciding at least one base station having a base station system parameter according to a change in the cell configuration because of expansion, moving or dismantlement of a base station; selecting at least one subscriber who is under the influence of changes in the base station; generating a home-zone list including at least one home-zone base station that can provide a home-zone service to every selected subscriber; and updating a database of the subscriber based on the generated home-zone list.

Another aspect of the present invention presents a system for updating a home-zone list in a subscriber database according to a change in a configuration of a cell in a cellular telecommunication system that supports a home-zone service, the system including a home-zone service center for receiving information about changes in a cell configuration that are caused by expansion, moving or dismantlement of a base station, and for generating a home-zone list for every subscriber who is under the influence of the changes in the configuration of a cell; and a home location register equipped with information about the cellular mobile telecommunication system subscribers and home-zone information for updating subscriber databases of all subscribers who are under the influence of a change in a configuration of a cell based on the home-zone list generated by the home-zone service center.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 5 is an exemplary diagram of a base station system parameter database according to the present invention;

FIG. 6 is an exemplary diagram of subscriber database according to the present invention;

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

The present invention optimizes the radio environment and other advantages in case at least one base station configuring a cellular mobile telecommunication network expands, moves or is dismantled, by selecting all subscribers included within a designated radius centering around such base stations aforementioned and by automatically generating a home-zone list for every subscriber to update a subscriber database in a real-time mode based on the generated list.

Figure 1:
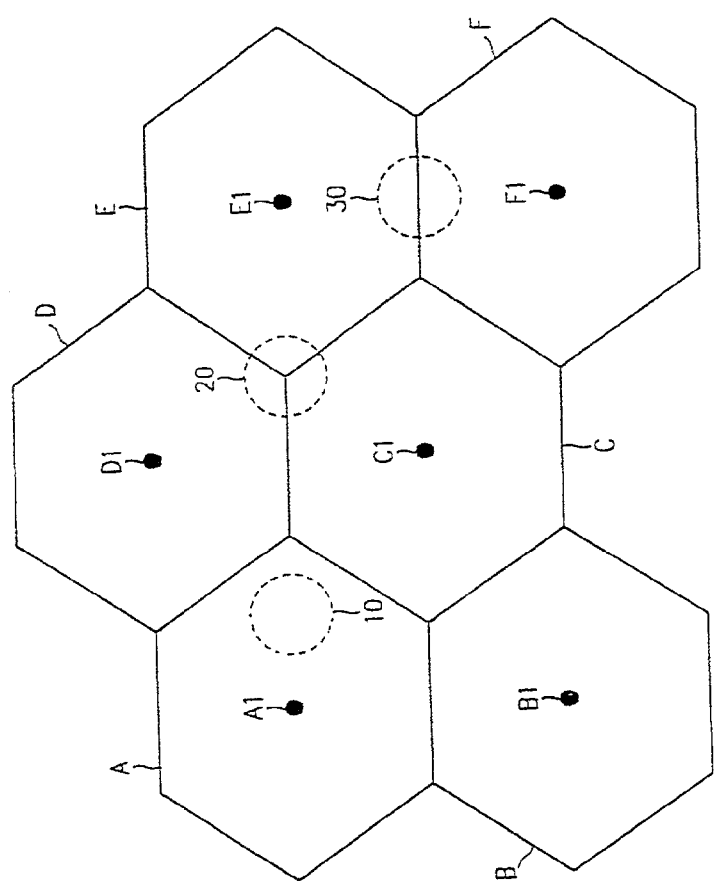
FIG. 1 is a diagram illustrating a home-zone service region of a cellular mobile telecommunication network to which the present invention is applied.

FIG. 1 is a diagram showing a home-zone service region of a cellular mobile telecommunication network to which the present invention is applied.

Referring to FIG. 1, a base station from the first through the sixth A1, B1, C1, D1, E1, and F1 has its own cell region from the first through the sixth A, B, C, D, E, and F, respectively. Furthermore, each base station can send/receive (send or receive or both send and receive) data wirelessly with mobile terminals located within its own cell region. Here, the data includes voice data, data that is required to process calls, and every kind of signal. The first through the sixth base stations A1, B1, C1, D1, E1, and F1 are either omni type base station having a single cell or a sector type base station having a cell being divided into a plurality of sectors. Depending on the type of a region, the base stations can be pico-base stations (Pico-BTS), each station having its own pico-cell.

Home-zone regions are manifested by the drawing reference numerals 10, 20 and 30. Here, the home-zone region 10 belongs to the first base station A1 only, and the home-zone region 20 covers the regions of the third through the fifth base stations C1, D1, and E1, and the home-zone region 30 covers the fifth base station E1 and the sixth base station F1 regions. Moreover, the home-zone regions 10, 20 and 30 can cover one or many sectors (or pico cells) from each base station.

Accordingly, the information about home-zone regions should include the information on a particular base station (and a sector thereof) which enables to provide services to the home-zone subscribers. Hereinafter, the base station which enables to provide services to the home-zone subscribers is defined as a home-zone base station, and the sector which enables to provide services to the home-zone subscribers from the home-zone base station is defined as a service sector.

Figure 2:
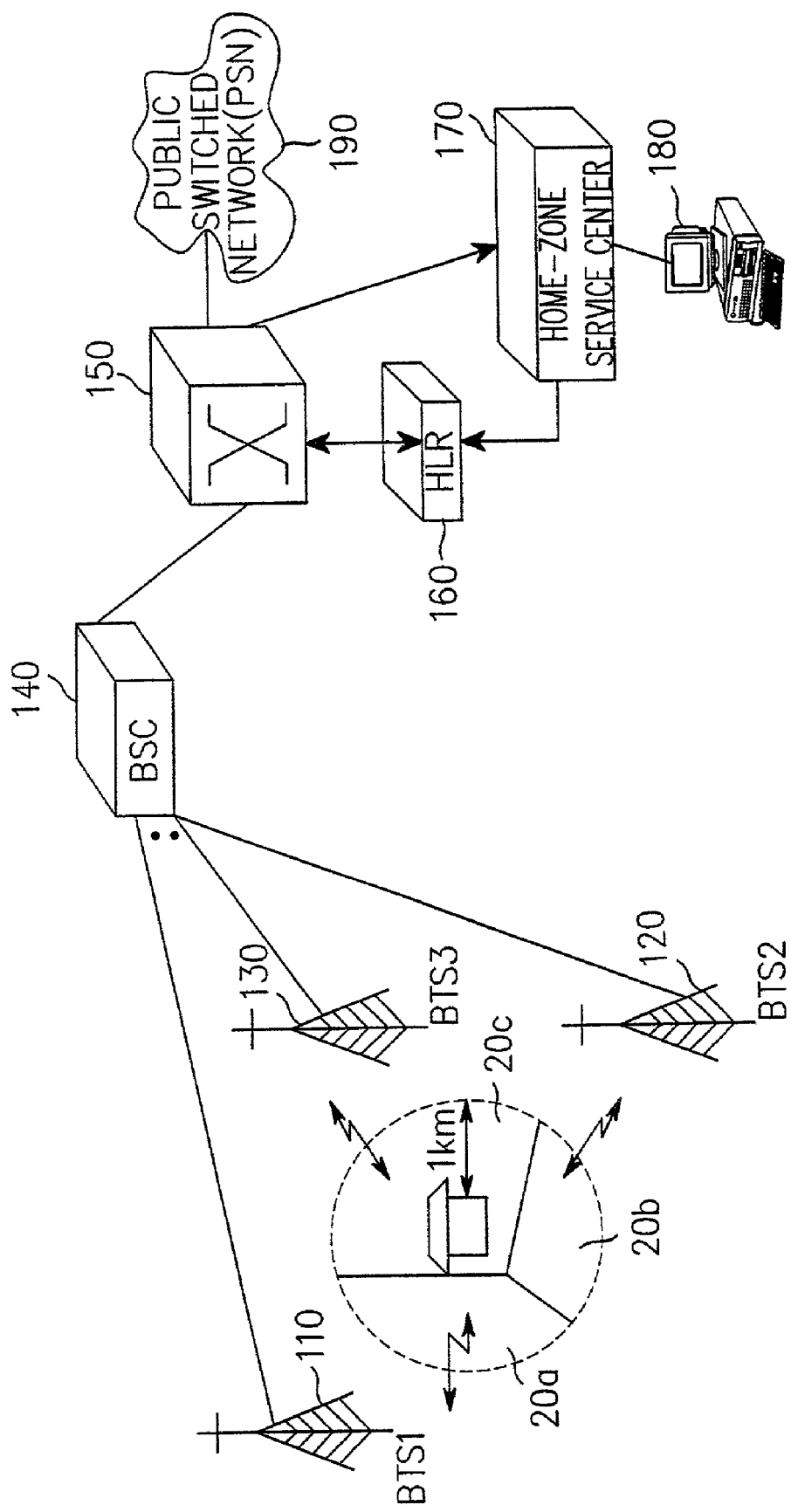
FIG. 2 is a schematic diagram illustrating a system for the home-zone service according to the present invention.

FIG. 2 is a schematic diagram of a home-zone service system according to the present invention. FIG. 2 illustrates a home-zone region 20 covering three base stations from the first through the third base stations 110, 120, and 130, and the home-zone region 20 is again divided into three small regions 20a, 20b, and 20c in accordance with a base station in service. Here, although the first through the third base stations 110, 120, and 130 can be a pico base station, sector base station or omni base station, it will not be specified from now on, but will be just called as a base station (BTS) in the following description.

Configuration of the system for performing the home-zone service and the method thereof will now be explained with reference to FIG. 2. The first base station 110 covers the first small region 20a, the second base station 120 covers the second small region 20b, and the third base station 130 covers the third small region 20c. The first through the third base stations 110, 120, and 130 are connected to a base station controller (BSC) 140, which enables telecommunication. Even though the base stations 110, 120, and 130 depicted in FIG. 2 are connected to one base station controller 140, they can be connected to more than two base station controllers that are different from each other, respectively. This may vary depending on regional circumstances where the home-zone region is located.

Mobile switching center (MSC) system 150 connects the base station controller 140 to another subscriber's system, for example, a public switched network (PSN) or mobile communication network 190, and provides mobile communication services, particularly the home-zone service, to mobile subscribers using information about the subscriber obtained from the home location register (HLR) 160. Here, the home location register 160 is mounted with a subscriber database which stores all kinds of subscriber information for mobile subscribers. In addition, the mobile switching center system 150 is connected to a home-zone service center 170 which stores and manages the home-zone information. The home-zone service center 170, being connected to a customer care center (CCC) 180, receives home-zone related data that is inputted by an operator, generates home-zone information therefrom, and sends the generated home-zone information to the home location register 160 for registration.

More specifically, the home-zone information is a list of home-zone substations (and service sectors) that provide home-zone services to the home-zone subscribers. In light of that, the home-zone information is defined as a home-zone list in the present invention. As shown in FIG. 2, the home-zone list includes information about the first through the third base stations 110, 120, and 130, and these three substations 110, 120, and 130 are defined as a home-zone base station combination.

Figure 3:
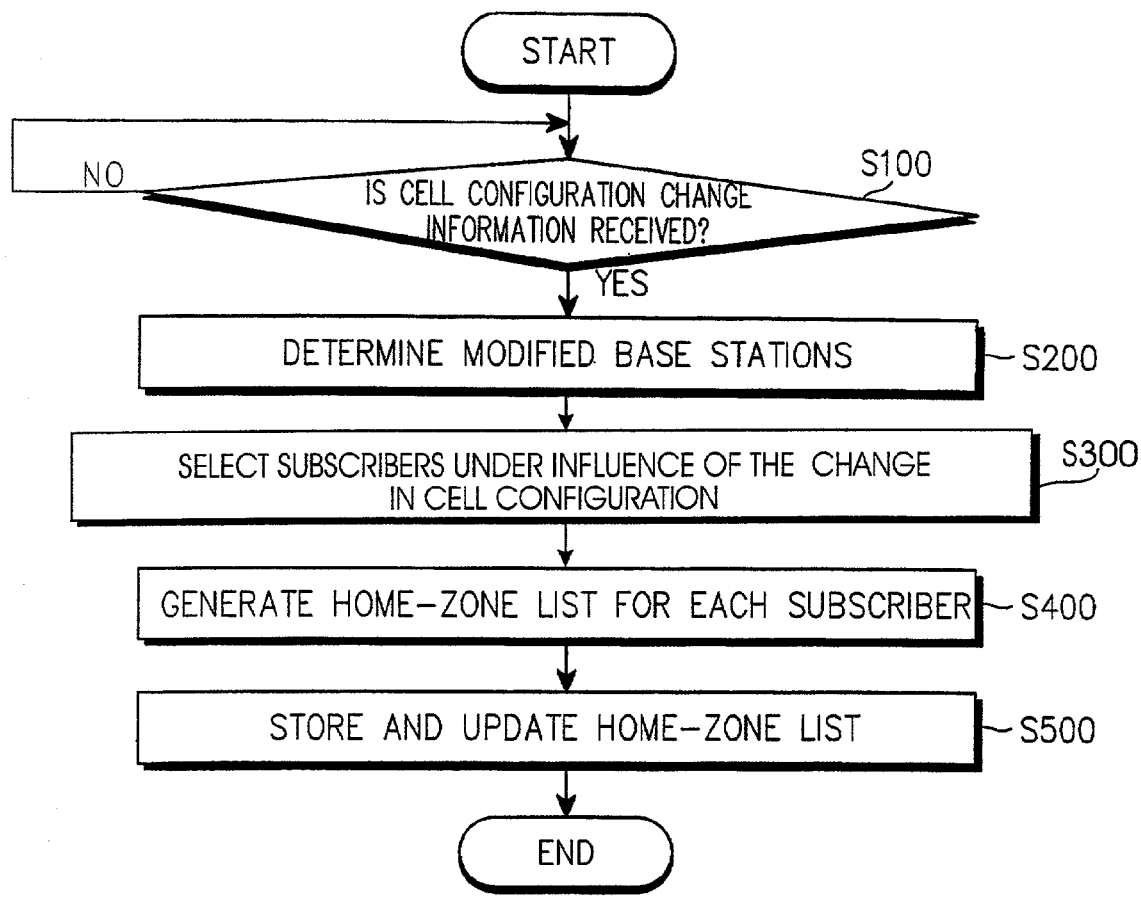
FIG. 3 is a flow chart illustrating an updating operation of a home-zone list according to the present invention.
Figure 4:
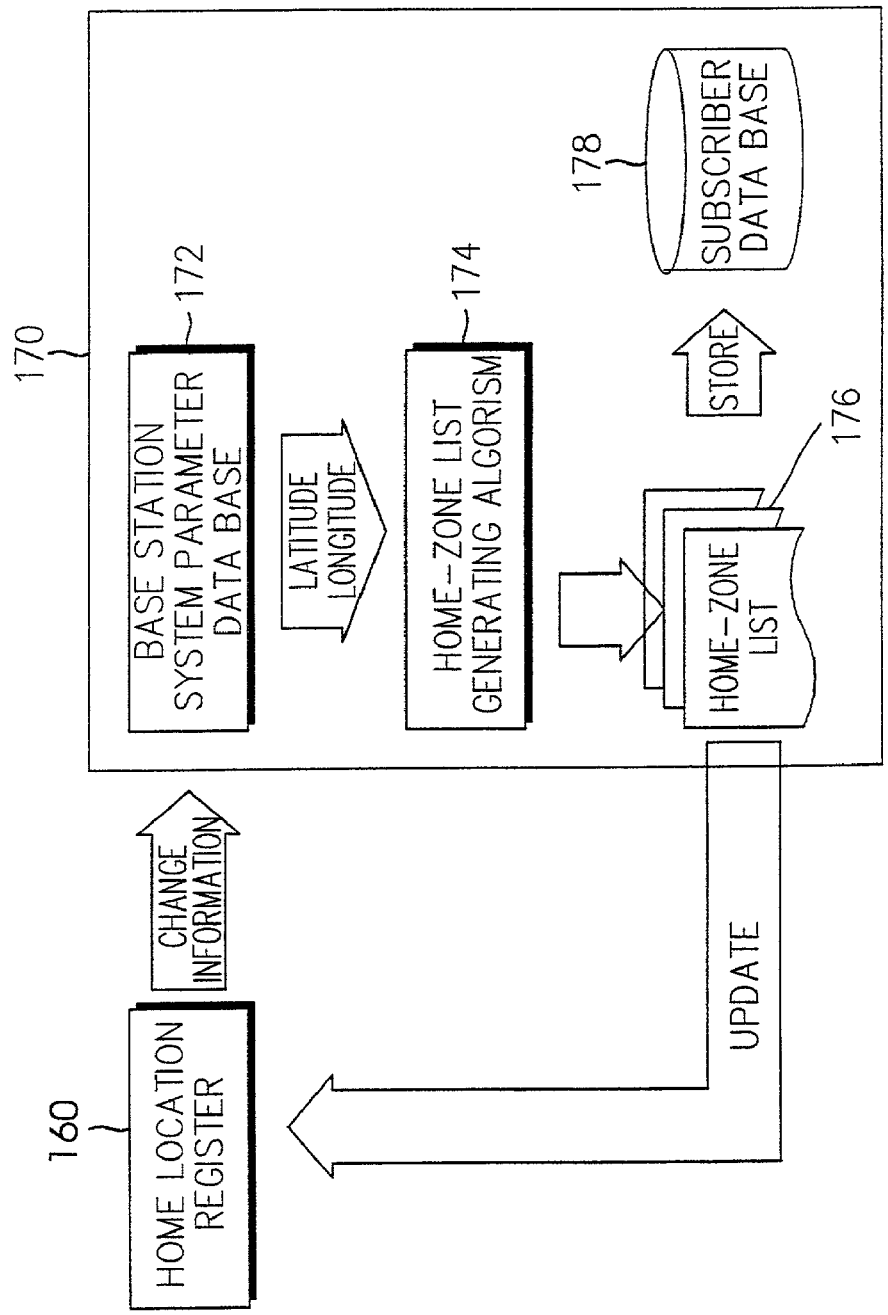
FIG. 4 is a block diagram illustrating an updating operation of a home-zone list according to the present invention.

FIG. 3 is a flow chart showing an updating operation of the home-zone list according to the present invention, and FIG. 4 illustrates a block diagram of the updating operation of the home-zone list according to the present invention. Referring to FIG. 3 and FIG. 4, the home-zone list updating step will now be described in more detail.

When the configuration of cell changes owing to expansion/moving/dismantlement (expansion, moving, or dismantlement) of the base station, the information of so called cell configuration change information is received to the home-zone service center 170 (S100). The cell configuration change information is later transmitted by a network operator for instance. Then the home-zone service center 170 updates a base station system parameter database 172 in the center according to the cell configuration change information.

Afterwards, the home-zone service center 170 determines base stations whose system parameters go though a modification because of the change in the configuration of the cell (S200). Here, the base stations with modified or changed base station system parameters include the base stations that are under expansion or moving, or other neighbor base stations located close to the base stations expanded or moved. In some other cases, such as if a certain base station is dismantled, the neighbor base stations to the dismantled base station become the base stations whose base station system parameters are subject to the change.

More explicitly speaking, when the third base station C1 in the cellular mobile telecommunication network with the configuration shown in FIG. 1 is dismantled, the cell regions A, B, D, E, and F of the other base stations A1, B1, D1, E1, and F1 are expanded towards the cell region C of the third base station C1, according to the nature of the radio environment. This eventually brings changes in a service sector's angle, causes system delay, and modifies service ranges to the base stations. In such case, the base stations whose base station system parameters are subjected to the change because of the dismantlement of the third base station C1 are the first, the second, the fourth, the fifth, and the sixth base stations A1, B1, D1, E1, and F1.

Next, the home-zone service center 170, using the coordinates determined in the step 200, selects all subscribers who are under the influence of the change in the cell configuration (S300). Here, the subscribers under the influence indicate the ones whose home-zone list undergoes the change or is expected to be changed because of the change in the cell configuration, and all subscribers who live within a designated distance centering around each coordinate of the base stations with modified system parameters due to the changes in the cell configuration belong to the subscribers under the influence. Here, the designated distance, say 15 km (kilometers), is taken into consideration especially when the home-zone list is generated. Also, the subscribers are carefully selected not to be overlapped by more than two base stations. This is because home-zone generating algorism for one subscriber should not be repeated.

Once the subscribers are selected, the home-zone list is generated based on the home-zone list generating algorism 174 for each selected subscriber (S400). In other words, the home-zone list generating algorism 174 first selects the base stations located within the predetermined distance from the home address, determines priorities for establishing a subscriber home-zone, and generates a home-zone list including the information about the home-zone substations that is required to provide home-zone services. Thusly generated home-zone list is then stored in a subscriber database 178 in the home-zone service center 170, and is updated in the home location register 160 at the same time (S500).

FIG. 5 illustrates a base station system parameter database mounted on the home-zone service center 170. As shown in the drawing, the base station system parameter database stores every base station's inherent ID (Bts_id), location information of each base station like latitude and longitude (lati, long), information about each sector like angle, system delay, and service range (angle, s_delay, svc_ran), exception range (exp_ran), change filed (change) and so forth. Before explaining about the exception range, it should be understood that the base stations located within the designated distance from the subscriber's residence regard (or decide) all sectors as a service sector. Here, the exception range is a value necessary for establishing the designated distance through which the base stations made the decision aforementioned.

The field reflecting the change in FIG. 5 can include bits that manifest, for example, whether the home-zone list should be updated because of the change in the cell configuration. That is to say, if the base station system parameter database is changed due to the change in the cell configuration, the field reflecting the change is set as a value for expressing the need of updating the home-zone list. If it is so, that is, if the field reflecting the change has the value for expressing the need of updating the home-zone list, the home-zone service center 170 starts the home-zone list updating procedure. Upon the completion of the home-zone list updating, the field reflecting the change is restored to a value expressing that there is no need of updating the home-zone list.

FIG. 6 illustrates a subscriber database which is mounted at the inside of the home-zone service center 170. As depicted in FIG. 6, the home-zone list to be stored in the subscriber database can further include information like service sector ID, or round trip delay range (RTD) for each home-zone base station, in order to provide better quality home-zone services. In FIG. 5, NSN (National Switching Number) means a number of a home-zone subscriber, and NID (Network ID) means an ID for identifying the network. In general, the NID is a number for identifying a mobile switching center (MSC) system or base station controllers in one group. The BTS_ID is used for identifying a base station, and the SECTOR_ID is used for distinguishing a service sector in case of a sector base station. The minimum and the maximum RTD indicate a time range or the time spent by a base station to send out a signal having a predetermined specific form and to receive the signal via a mobile terminal in a home-zone residence.

Figure 7:
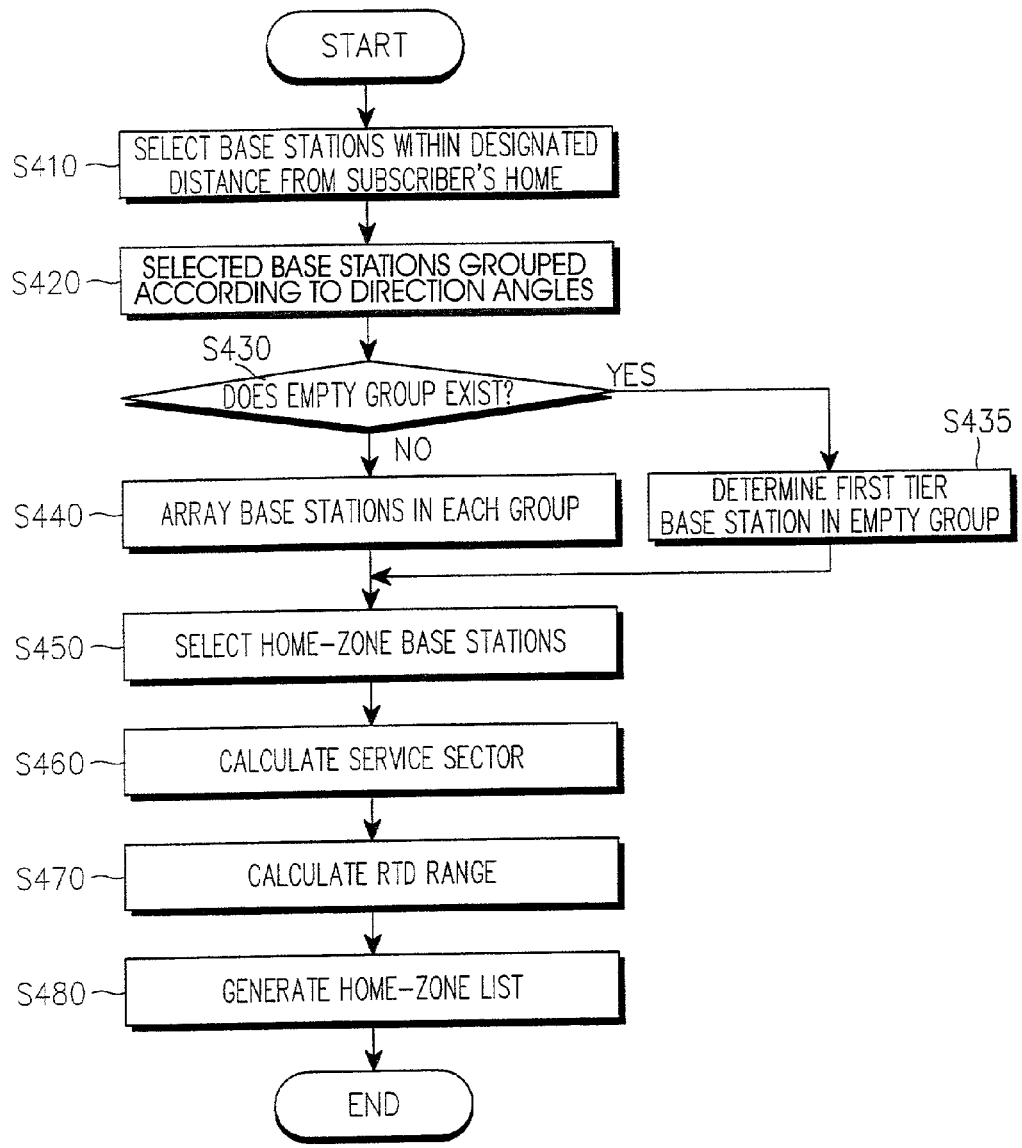
FIG. 7 is a flow chart illustrating a home-zone list generation operation according to the present invention.

FIG. 7 is a flow chart illustrating detailed steps of generating the home-zone list. One thing to be noticed here is that every step shown in FIG. 7 is performed for every subscriber who has been selected in the step S300. Although the home-zone list generation step (S400) will be explained in more detail below, one should understand the technique for selecting base stations and subscribers under the influence of the change in the cell configuration and updating the home-zone list of every selected subscriber.

Referring to FIG. 7, the home-zone service center 170 selects the base stations located within the predetermined designated distance from the residence (S410). To this end, the home-zone list generating algorism 174 first determines the latitude and the longitude corresponding to the inputted home address, and calculates the distance between home (the residence) and base stations (hereinafter, it is abbreviated to as DHB), based on the latitude and the longitude of the residence and the latitudes and longitudes of all base stations that are stored in the base system parameter database (refer to FIG. 5). The equation for calculating the distance between home and abase station (DHB) is shown as follows:

$$D = ((x_{bts} - x_{home}) \times d_{lon})^2 + ((y_{bts} - y_{home}) \times d_{lat})^2 \quad \text{<Mathematical Equation I>}$$

where $x_{bts}$ and $y_{bts}$ are the longitude and the latitude of a base station; $x_{home}$ and $y_{home}$ are the longitude and the latitude of a home-zone subscriber home (residence); $d_{lon}$ is the distance corresponding to one longitude second of the subject region; and $d_{lat}$ is the distance corresponding to one latitude second of the subject region. Taking Sidney for an example, the $d_{lat}$ is 30.63 m (meters), and the $d_{lon}$ is 25.95 m. Then in the step 410, using the DHB obtained from the Mathematical Equation I, all base stations that are located within or on the boundary of the predetermined designated distance (e.g., 15 km (kilometers)) are selected.

Figure 8:
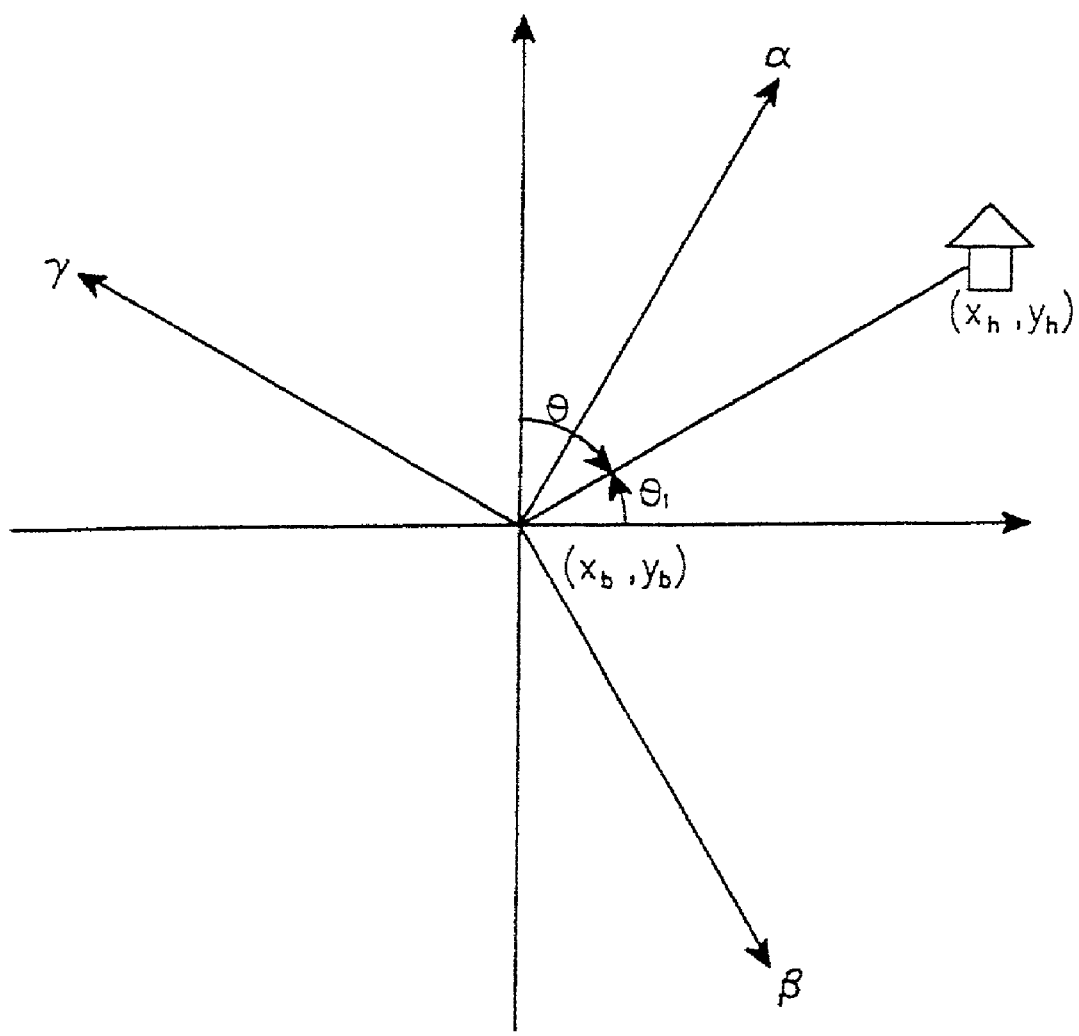
FIG. 8 is an axis chart illustrating a residence of a home-zone subscriber and a direction of a base station.

In the next step (S420), the selected base stations are divided into a plurality of groups in accordance with a direction angle from the corresponding base station to the home-zone subscriber's home (Home Angle from BTS) (hereinafter, it is abbreviated to as HAB). To this end, the direction angle of each selected base station first needs to be calculated, respectively, using the longitude and the latitude of home, and the longitude and the latitude of the selected base station. The following equation shows how to calculate the direction angle of the base station:

$$\theta_1 = \arctan\left(\frac{y_{bts} - y_{home}}{x_{bts} - x_{home}}\right) \quad \text{< Mathematical Equation II >}$$

where $\theta_1$ indicates an angle that increase counterclockwise centering around the x-axis, the latitude. FIG. 8 illustrates the angle, $\theta_1$. In reality, however, it is much more convenient to use the direction angle (in degree) that increases clockwise, given that 12 o'clock is 0 degree, in order to find out the actual direction of the base station in question. FIG. 8 shows an example of the direction angle $\theta_1$ in accordance with the present invention. Therefore, to determine the actual direction angle $\theta$, the following conversions are necessary, complying with the signs of $(x_{home} - x_{bts})$ and $(y_{home} - y_{bts})$:

If $(x_{home} - x_{bts}) = 0$, and $(y_{home} - y_{bts}) > 0$, $\theta$ is 0 degree;
If $(x_{home} - x_{bts}) > 0$, and $(y_{home} - y_{bts}) > 0$, $\theta$ is $(90 - \theta_1)$ degrees;
If $(x_{home} - x_{bts}) > 0$, and $(y_{home} - y_{bts}) = 0$, $\theta$ is 90 degrees;
If $(x_{home} - x_{bts}) > 0$, and $(y_{home} - y_{bts}) < 0$, $\theta$ is $(90 - \theta_1)$ degrees;
If $(x_{home} - x_{bts}) = 0$, and $(y_{home} - y_{bts}) < 0$, $\theta$ is 180 degrees;
If $(x_{home} - x_{bts}) < 0$, and $(y_{home} - y_{bts}) < 0$, $\theta$ is $(270 - \theta_1)$ degrees;
If $(x_{home} - x_{bts}) < 0$, and $(y_{home} - y_{bts}) = 0$, $\theta$ is 270 degrees;
If $(x_{home} - x_{bts}) < 0$, and $(y_{home} - y_{bts}) > 0$, $\theta$ is $(270 - \theta_1)$ degrees; and
If $(x_{home} - x_{bts}) = 0$, and $(y_{home} - y_{bts}) = 0$, meaning that the base station coincides with the home-zone subscriber's home, this case should be handled separately.

Figure 9:
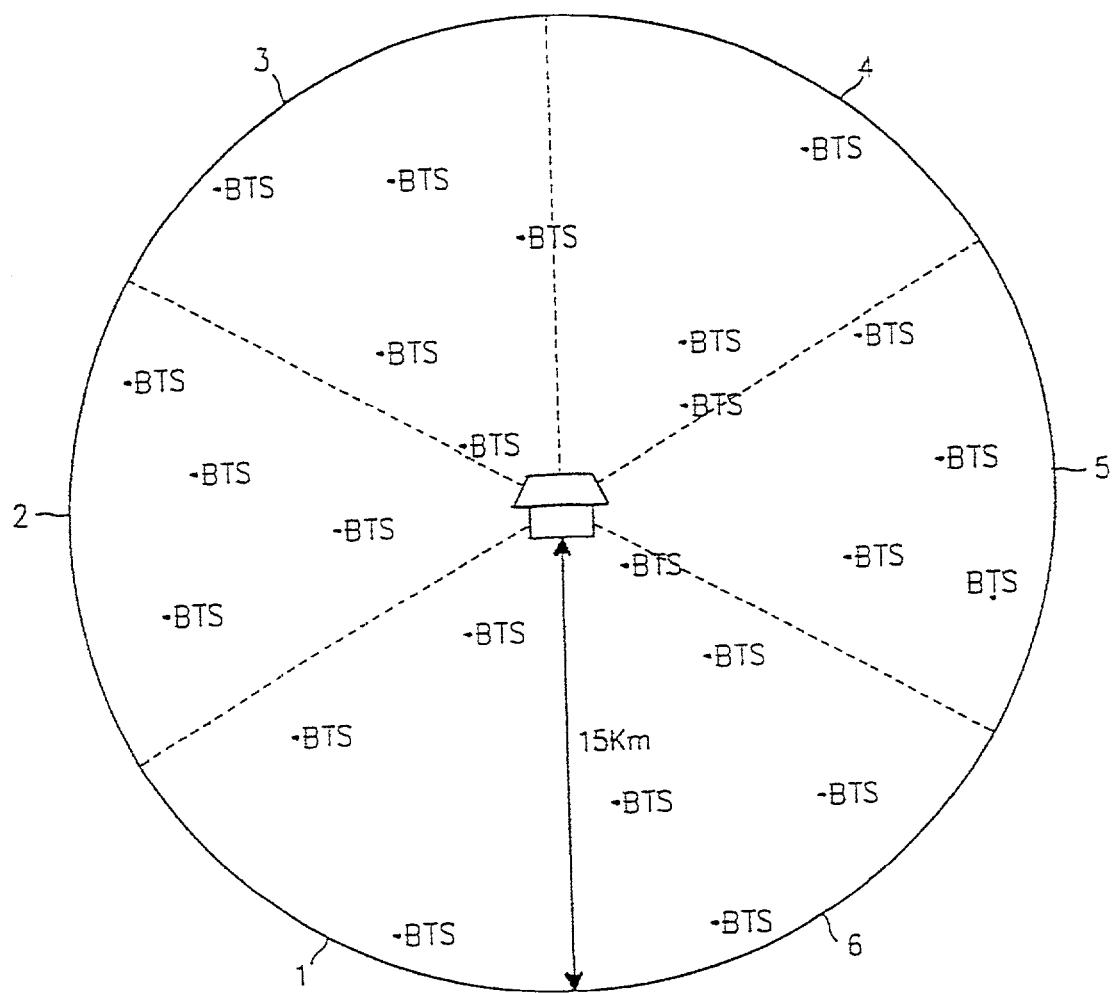
FIG. 9 is a diagram illustrating base stations in a group according to a direction angle.

Using the direction angle (HAB) calculated from the Mathematical Equation II and the conversion rules listed above, the home-zone list generating algorism 174 groups the base stations selected in the step 410. For example, as shown in FIG. 9, the base stations can be divided into a total of 6 groups, having 60 degrees as one unit. Then, the base stations having their direction angles from 0 degree through 59 degrees become the first group 1; the base stations from 60 degrees through 119 degrees become the second group 2; the base stations from 120 degrees through 179 degrees become the third group 3; the base stations from 180 degrees through 239 degrees become the fourth group 4; the base stations from 240 degrees through 299 degrees become the fifth group 5; and the base stations from 300 degrees through 359 degrees become the sixth group 6. In addition, it is also possible that one group can be an empty group without any base stations, depending on the array of the base stations.

In the meantime, if the selected base stations form a sector base station, a sector direction angle (Angle Between Sector and Home: ASH) should be calculated using the direction angle (HAB) calculated previously. This is because the sectors service to different directions centering around the base station, so it is necessary to decide whether each sector is capable of servicing the home direction. In order to calculate the ASH, a sector angle stored in the subscriber system parameter database is used. The sector angle means the direction that a sector antenna turns to, given that the base station is the center. Therefore, the sector's direction angle is the difference between the direction angle of the base station (HAB) and the sector angle, that is, "HAB−ASH_|αβγ|". Also, since the sector's direction angle is an absolute value, if the difference is greater than 180, it has to be recalculated as an absolute value.

FIG. 8 illustrates the directions of sectors, α, β, and γ, centering around the base station. Referring to the drawing, suppose that the direction angle (HAB) of the base station is 50 degrees, the angle of α sector is 20 degrees, the angle of β sector is 150 degrees, and the angle of γ sector is 290 degrees. Based on these values, the sector's direction angle (ASH) of each sector can be calculated. For example, the direction angle of the α sector, ASH_α, will be |50−20|=30, and the direction angle of the β sector, ASH_β, will be |150−50|=100. On the other hand, since the direction angle of the γ sector, ASH_γ, is |290−50|=240 being greater than 180, it is recalculated as |360−240|=120. Therefore, a conclusion can be derived from the result above that as the sector's direction angle gets closer to 180 degrees, the corresponding sector turns towards the opposite direction of the home-zone subscriber's home.

Meanwhile, if it turns out that no empty group exists as a result of the grouping (S430), the home-zone list generating algorism 174 arrays the base stations of each group in order of distance from the home-zone subscriber's home, and divides the base stations of each group into a plurality of tiers (S440). Here, the tier means the order of the base stations that can provide the best quality home-zone services to the home-zone subscriber centering around his or her home. Especially, it should be noted that the tier is defined in consideration of not only the distance from the home-zone subscriber's home but also the direction angle of the base station.

Particularly, in the preferred embodiment of the present invention, the first tier through third tier base stations are first decided in six groups, respectively. In other words, the first tier through the third tier base stations among three base stations in each group, given that the base stations are nearest ones to the home-zone subscriber's home, are decided based on the step explained below.

Suppose that the three base stations located nearest to the home-zone subscriber's home are base station A, base station B, and base station C in order, and that the distance from the home-zone subscriber's home to each substation is DHB_A, DHB_B, and DHB_C, respectively (on the condition that these distances satisfy the relation of DHB_A<DHB_B<DHB—C). Then, the first tier base station is decided based on the following step.

As for the first example, if both (DHB_B−DHB_A) and (DHB_C−DHB_A) are smaller than the predetermined designated tier division adjust distance (D_TIER_ADJUST), the first tier base station will be one having the smallest sector direction angle among the three base stations. For example, suppose that the tier division adjust distance is 150 m, and that the base station ID for the three base stations in the first group (i.e., 12, 16 and 74), the distance from the home-zone subscriber's home (DHB) to each base station, and the sector direction angle are as shown in the <Table 1> below.

TABLE 1

| Base station ID | Distance (DHB) | α sector direction angle | β sector direction angle | γ sector direction angle |
|---|---|---|---|---|
| 12 | 100 m | 60 | 210 | 310 |
| 16 | 150 m | 50 | 250 | 350 |
| 74 | 200 m | 80 | 230 | 330 |

As shown in Table 1, since the distance between the base station 74 and the base station 12 is smaller than 150 m, the base station having the smallest sector direction angle (alpha sector direction angle is 50 degrees) will be the first tier base station.

As for the second example, suppose that (DHB_B−DHB_A) and (DHB_C−DHB_B) are smaller than the tier division adjust distance (D_TIER_ADJUST), and (DHB_C−DHB_A) is greater than the tier division adjust distance, the first tier base station is the one having the smallest sector direction angle out of two base stations (i.e., base station A and Base station B), given that the base stations A and B are the closest to the home-zone subscriber's home. For example, suppose that the tier division adjust distance is 150 m, and that the base station ID for the three base stations in the first group (i.e., 12, 16 and 22), the distance from the home-zone subscriber's home (DHB) to each base station, and the sector direction angle are as shown in the <Table 2> below.

TABLE 2

| Base station ID | Distance (DHB) | α sector direction angle | β sector direction angle | γ sector direction angle |
|---|---|---|---|---|
| 12 | 100 m | 60 | 210 | 310 |
| 16 | 150 m | 250 | 150 | 50 |
| 22 | 200 m | 80 | 260 | 330 |

In this case, the distance between the base station 12 and the base station 16 is smaller than 150 m, and the distance between the base station 16 and the base station 22 is also smaller than 150 m, while the base station 22 being away from the base station 12 by more than 150 m. Therefore, comparing the base station 12 and the base station 16, the base station 16 will be the first tier base station since it has the smallest sector direction angle (gamma sector direction angle is 50 degrees).

As for the third example, suppose that (DHB_B−DHB_A) is greater than the tier division adjust distance. Then, the first tier base station will be one of the three base stations (base station A, base station B, and base station C) whose distance to the home-zone subscriber's home is the smallest. For example, suppose that the tier division adjust distance is 150 m, and that the base station ID for the three base stations in the first group (i.e., 12, 16 and 74), the distance from the home-zone subscriber's home (DHB) to each base station, and the sector direction angle are as shown in the <Table 3> below.

TABLE 3

| Base station ID | Distance (DHB) | α sector direction angle | β sector direction angle | γ sector direction angle |
|---|---|---|---|---|
| 12 | 100 m | 60 | 210 | 310 |
| 16 | 150 m | 50 | 250 | 350 |
| 74 | 200 m | 80 | 230 | 330 |

In this case, since the distances among the three base stations are all greater than 150 m, is the base station 12 will be the first tier base station since it is closest to the home-zone subscriber's home.

Once the first tier base station is decided through the above-described procedure out of the three base stations that are nearest to the home-zone subscriber's home in each group, the remaining second and the third tier base stations are decided as well. At this time, the other base stations except for the first tier base station in each group are arrayed in order of distance. After that, having a predetermined start adjust distance, D_STIER_ADJUST, as the boundary, proprieties are given to the base stations distributed farther or within the boundary. Particularly, a base station with smaller sector direction angle (ASH) has a higher priority. Then, by adding another unit adjust distance, D_VTIER_ADJUST, to the start adjust distance, the priority adjustment operation aforementioned is repeated at every boundary.

For instance, suppose the start adjust distance is 1000 m, and that the unit adjust distance is also 1000 m. In this case, having 1000 m as the boundary, the home base stations in each group located around the boundary are arrayed on the home-zone list, and the base stations with smaller sector direction angles (ASH) have higher priorities. Similarly, having 2000 m, 3000 m, . . . as the boundary, the same operation is repeated, that is, the base stations with smaller sector direction angles (ASH) out of the base stations located above/below (above or below) the corresponding boundary are arrayed to have higher priorities over others. In the present invention, for example, since selected base stations are located within 15 km, the array operation will be repeated fifteen times.

In the meantime, if it turns out that there exists an empty group as the result of grouping in step S430, the home-zone list generating algorism 174 includes one base station that is nearest to the empty group out of the second and the third tier base stations in neighbor groups to the empty group (S435). In this manner, the empty group becomes the first tier base station. Here, the empty group is defined as a group that has the first tier base station only.

More specifically speaking, if the third group is the empty group, the nearest base station to the third group among the second tier and the third tier base stations in other neighbor groups, such as the second group or the fourth group, is designated as the first tier base station of the empty group. In case the second tier base station of the fourth group becomes the first tier base station of the empty group, one of the remaining base stations in the fourth group should be designated as the second tier base station.

In the next step (S450), a pre-designated number of high priority base stations selected from the arrayed base stations become the home-zone base stations. For instance, a total of 18 base stations can be selected by determining the first through the third tier base stations from each group, and 16 out of 18 stations with higher priorities are designated as the home-zone base stations. However, in some case, there might be many empty groups, and because of that the total base stations available for the first tier through the third tier base stations become less than 16. In such a case, the home-zone base stations are selected from other remaining base stations, that is, more than the fourth tier base stations, having higher priorities. Here, the priorities of more than the fourth tier base stations are determined in order of distance from the home-zone subscriber's home, a closer base station getting a higher priority.

Afterwards, a sector for servicing the home-zone subscribers (hereinafter, it is referred to as service sector) is selected for each home-zone base station (S460). That is to say, if a certain sector of a home-zone base station turns towards the opposite direction of the home-zone subscriber's home, the sector is not supposed to be selected. This is so because the sector might not be able to service the home-zone subscriber at all.

Usually, a distance for use of selecting the service sector, is under the influence of antenna beam pattern back lobe components. The back lobe limit distance is defined as a maximum distance on which the back lobe of the sector antenna can influence. In general, it is the distance that a radio wave can reach within four chip. For instance, the four-chip distance in CDMA (Code Division Multiple Access) system using 1.2295 Mcps chip speed is 976 m.

An example of selecting the service sector of an arbitrary home-zone base station is explained below.

First of all, if the home-zone subscriber's home is located within the predetermined back lobe limit distance (D_BACKLOB_LIMIT) from the home-zone base station, all sectors of the corresponding base station are selected as the service sector. This is so because, although a sector may turn to the opposite direction of the home-zone subscriber's home of the corresponding base station, the back lobe of the sector antenna can cover the home-zone subscriber's home.

Secondly, if the home-zone subscriber's home is not located within the predetermined back lobe limit distance (D_BACKLOB_LIMIT) from the home-zone base station, the sectors having smaller sector direction angles than the predetermined designated standard sector direction angle are selected as the service sector. This is so because the sector antenna having greater than the standard sector direction angle cannot cover the home-zone subscriber' home. For example, the standard sector direction angle is 100 degrees.

Thirdly, if the home-zone base station is not the sector type base station, that is, if it is either omni type or micro-cell type base station, all sectors of the corresponding base station are selected as the service sector.

After the step S460, the home-zone list generating algorism 174 calculates an RTD range (S470), that is, a minimum RTD and a maximum RTD, to be included to the home-zone list for each finally selected home-zone base station. An example of calculating the minimum RTD and the maximum RTD for an arbitrary home-zone base station is explained below.

If the maximum distance a radio wave can travel within one chip is approximately 244 m, the maximum RTD is fixated as 120. To obtain the minimum RTD, an initial RTD should be found based on the following <Mathematical Equation 3>, using the distance between the base station and the home-zone subscriber's home, and the system delay of the corresponding base station.

Initial $RTD=(DHB+\text{System Delay})\times 0.95$ <Mathematical Equation 3>

Based on the initial RTD, The minimum RTD is then obtained using the <Mathematical Equation 4> below.

If Initial $RTD<400$.

Minimum $RTD=(DHB+\text{System Delay})\times 0.95$

If not, i.e., Initial $RTD \geq 400$,

Minimum $RTD=(DHB+\text{System Delay})-20$. <Mathematical Equation 4>

Here, the system delay is a minimum system delay value for a signal from a wireless terminal going through a base station to return. The system delay is obtained by multiplying the system delay of a sector stored in the base station parameter database by 8.

The following illustrates how to calculate the minimum RTD.

Suppose that the system delay of a sector is 31. Then the system delay will be 31×8=248. If the base station is located on the roof of the home-zone subscriber's home, meaning that the DHB is zero, the minimum RTD will be (0+248)×0.95=235.6 m.

Finally, the home-zone list generating algorism 174 generates the home-zone list for storing the information related to the minimum RTD, the maximum RTD, and at least one service sector ID for each finally selected home-zone base station in step S480. The <Table 4> below shows part of the home-zone list generated in accordance with the present invention.

TABLE 4

| Base station ID | Minimum RTD | Maximum RTD | Service Sector |
|---|---|---|---|
| 1 | 10 | 232 | 312 | α, β, γ |
| 2 | 18 | 232 | 312 | α |
| 3 | 12 | 306 | 386 | α, β |

Thusly generated home-zone list is transmitted to the home location register 180 by the home-zone service center 170. The home location register 180, using the home-zone list that has been provided by the home-zone service center 170, updates the old home-zone list stored in its subscriber database.

In short, the present invention is very useful in many ways. Among many others, the most representative effects or advantages of the present invention are explained below.

First of all, when the configuration of the cell is changed mainly because the base station is expanded, moved or dismantled, the present invention first makes the database based on the changed cell configuration, and enables to obtain the home-zone list reflecting the changes in the cell configuration very simply by determining the base stations whose base station system parameters go through the change and generating the home-zone list for the designated subscribers on the basis of the determined base stations. In addition, the present invention is capable of updating the home-zone list automatically without asking the subscribers to connect their calls separately, providing more convenient services to the subscribers. Further, when the configuration of the cell changes, the present invention immediately applies the change so that it can provide more accurate home-zone services anytime.

While the invention has been shown and described with reference to a certain preferred saw embodiment thereof, it will be understood by those skilled in the art that various changes in form and it details may be made therein without departing from the spirit and scope of the invention as defined by the appended claims.

What is claimed is:

1. A method for updating a home-zone list in a subscriber database according to a change in a cell configuration in a cellular mobile telecommunication system equipped with a home-zone service center for defining a region with differential charges as a home-zone and controlling home-zone services, the method comprising the steps of:

determining at least one base station with system parameters being modified in response to a change in cell configuration;

selecting at least one subscriber being under the influence of changes in said base station;

generating a home-zone list including at least one home-zone base station providing a home-zone service to every selected subscriber; and updating a database of the subscriber based on the generated home-zone list, said base station with base station system parameter going through a modification due to the change in the cell configuration, being selected from a group consisting essentially of at least one of a base station under expansion or moving, neighbor base stations of the base station under expansion or moving, and neighbor base stations of a base station being dismantled.

2. The method as claimed in claim 1, said step of selecting at least one subscriber further comprised of every subscriber having a residence within a designated distance from each of the determined base stations being selected to not be duplicated.

3. The method as claimed in claim 1, further comprising the change in the cell configuration being from any one of expansion, moving and dismantlement of a base station.

4. The method as claimed in claim 1, further comprising of determining whether information of the change in cell configuration is received before said step of determining at least one base station with system parameters being modified.

5. The method as claimed in claim 1, further comprising the step of storing said home-zone list after said step of generating said home-zone list.

6. A method for updating a home-zone list in a subscriber database according to a change in a cell configuration in a cellular mobile telecommunication system equipped with a home-zone service center for defining a region with differential charges as a home-zone and controlling home-zone services, the method comprising the steps of:

determining at least one base station with system parameters being modified in response to a change in cell configuration;

selecting at least one subscriber being under the influence of changes in said base station;

generating a home-zone list including at least one home-zone base station providing a home-zone service to every selected subscriber; and updating a database of the subscriber based on the generated home-zone list, said step of generating said home-zone list further comprising the sub-steps of:

selecting base stations located within a designated distance from each residence of the selected subscribers, respectively, using information about the selected subscriber home address and location information on all base stations configuring the cellular mobile telecommunication system;

grouping the selected base stations into a plurality of groups in accordance with a direction angle reflecting a direction the selected base stations face towards the selected subscriber home;

arraying the selected base stations in the plurality of groups in accordance with priorities of providing a maximum quality of home-zone services to the selected subscribers;

determining, in accordance with the array result, home-zone base stations based on a predetermined designated number of base stations selected from the base stations having high priorities;

determining a service sector for servicing the home-zone subscribers to each determined home-zone base station; and generating the home-zone list including information about the determined home-zone base stations and information about the service sector.

7. The method as claimed in claim 6, further comprising the steps of:

determining whether there is an empty group; and determining a base station to be included in the empty group.

8. A system for updating a home-zone list in a subscriber database according to a change in a configuration of a cell in a cellular telecommunication system defining a region practicing differential charges as a home-zone and supports a home-zone service, the system comprising:

a home-zone service center receiving information about changes in a cell configuration, and for generating a home-zone list for every subscriber who is under the influence of the changes in the configuration of a cell, said home-zone service center further comprising:

a first unit including the system parameters of the base station having cell configuration changes, a second unit generating the home-zone list, and a third unit storing the home-zone list; and a home location register equipped with information about the cellular mobile telecommunication system subscribers and home-zone information for updating subscriber databases of all subscribers who are under the influence of a change in a configuration of a cell based on the home-zone list generated by the home-zone service center, said base station with base station system parameter going through a modification due to the change in the cell configuration, being selected from a group consisting essentially of at least one of a base station being under expansion or moving, neighbor base stations of the base station being under expansion or moving, and neighbor base stations of a base station being dismantled.

9. The system as claimed in claim 8, said home-zone service center determining at least one base station having modified base station system parameters due to the change in the cell configuration, and selecting subscribers who have homes within a designated distance from each of the determined base stations not to be overlapped.

10. The system as claimed in claim 8, further comprising the change in the cell configuration being from any one of expansion, moving and dismantlement of a base station.

11. A method, comprising:
determining base stations with system parameters being modified according to a change in a configuration of a cell of cellular mobile telecommunication;
selecting all subscribers affected by the change in the configuration of the cell;
generating a home-zone list for each of the selected subscribers; and
updating the home-zone list,
said base station with base station system parameter going through a modification due to the change in the cell configuration, being selected from a group consisting of at least one of a base station under expansion or moving, neighbor base stations of the base station under expansion or moving, and neighbor base stations of a base station being dismantled.

12. The method of claim 11, with all subscribers affected by the change in the configuration of the cell being all subscribers living within a designated distance centering around each coordinate of the base stations with modified system parameters due to the changes in the configuration of the cell.

13. The method of claim 12, with all subscribers affected by the change in the configuration of the cell being selected to not overlap by more than two base stations.

14. The method of claim 11, further comprising of storing the home-zone list at a first unit while updating the home-zone list at a second unit at the same time.

15. The method of claim 11, said step of selecting all subscriber affected by the change further comprised of every subscriber having a residence within a designated distance from each of the determined base stations being selected to not be duplicated.

16. The method of claim 11, said step of generating the home-zone list further comprising determining priorities establishing a subscriber home-zone.

17. A method, comprising:
determining base stations with system parameters being modified according to a change in a configuration of a cell of cellular mobile telecommunication;
selecting all subscribers affected by the change in the configuration of the cell;
generating a home-zone list for each of the selected subscribers; and
updating the home-zone list,
said step of generating the home-zone list further comprising:
selecting the base stations located within a predetermined distance from a home of the subscriber;
determining priorities establishing a subscriber home-zone; and
generating the home zone list including information about home-zone substations required to provide home-zone services.

18. A method for updating a home-zone list in a subscriber database according to a change in a cell configuration in a cellular mobile telecommunication system equipped with a home-zone service center for defining a region with differential charges as a home-zone and controlling home-zone services, the method comprising the steps of:
determining at least one base station with system parameters being modified in response to a change in cell configuration;
selecting at least one subscriber being under the influence of changes in said base station;
generating a home-zone list including at least one home-zone base station providing a home-zone service to every selected subscriber; and
updating a database of the subscriber based on the generated home-zone list,
said step of generating said home-zone list further comprising the sub-steps of:
selecting base stations located within a designated distance from each residence of the selected subscribers, respectively, using information about the selected subscriber home address and location information on all base stations configuring the cellular mobile telecommunication system;
grouping the selected base stations into a plurality of groups in accordance with a direction angle reflecting a direction the selected base stations face towards the selected subscriber home; and
arraying the selected base stations in the plurality of groups in accordance with priorities of providing a maximum quality of home-zone services to the selected subscribers.

* * * * *